Oct. 13, 1942. J. S. CZURLES ET AL 2,298,264
WING SLAT EQUALIZER
Filed Jan. 31, 1941 2 Sheets-Sheet 1
Fig. 1
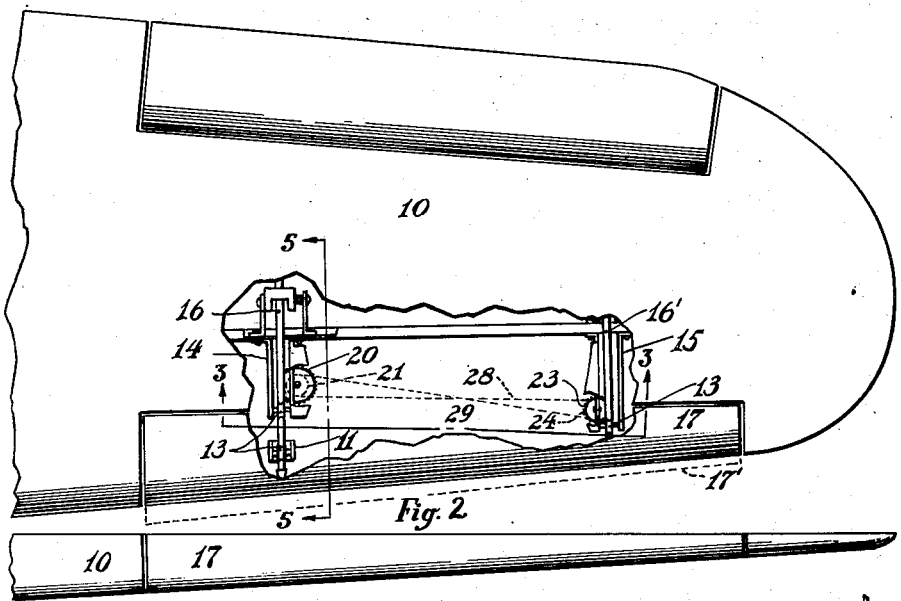
Fig. 2
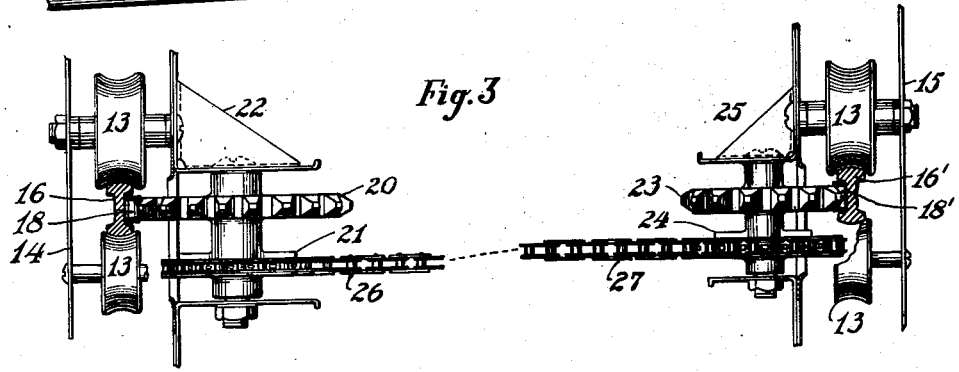
Fig. 3
Fig. 4
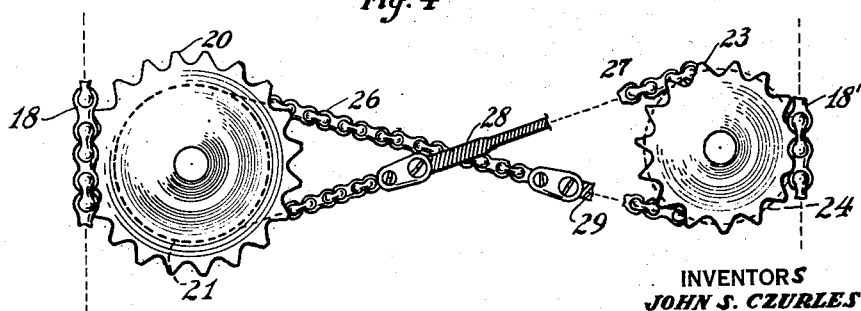
INVENTORS
JOHN S. CZURLES AND
BY FRANK ERNY
ATTORNEY

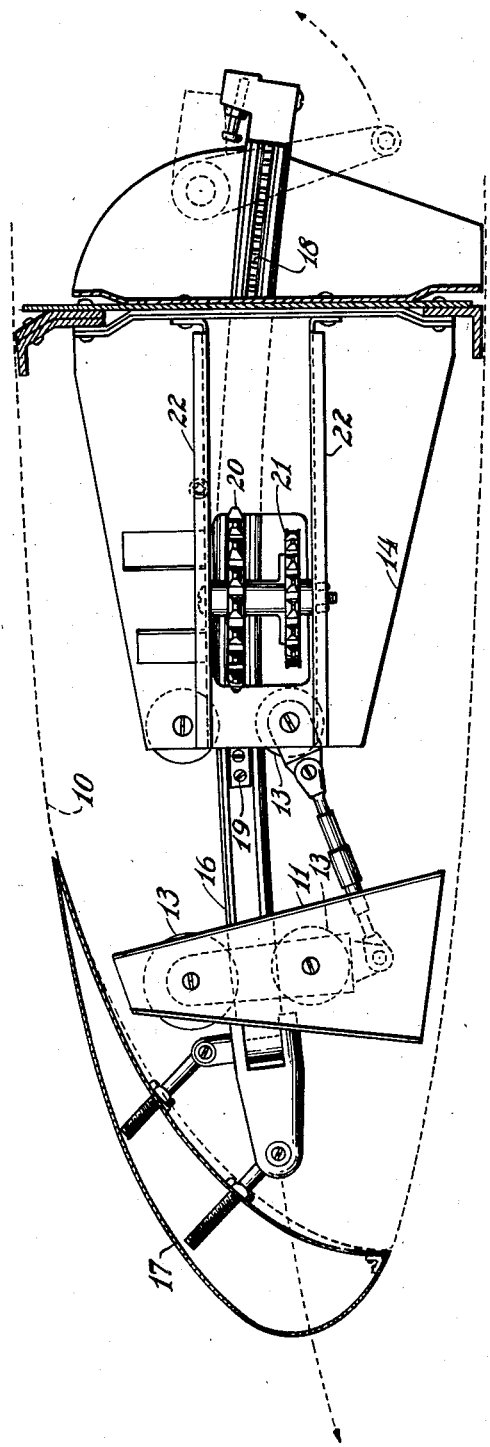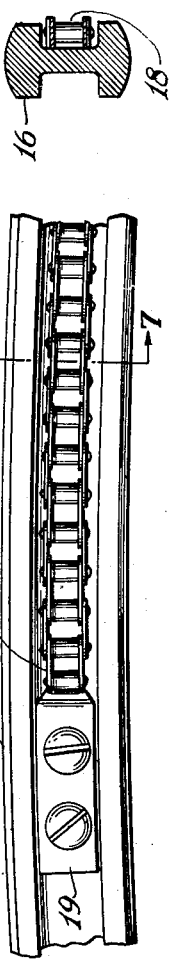

Patented Oct. 13, 1942

2,298,264

UNITED STATES PATENT OFFICE 2,298,264

WING SLAT EQUALIZER

John S. Czurles, Buffalo, and Frank Erny, Kenmore, N. Y., assignors to Curtiss-Wright Corporation, a corporation of Delaware Application January 31, 1941, Serial No. 376,756

4 Claims. (Cl. 244—42)

This invention relates to aircraft, and more particularly to controls for slot-forming auxiliary airfoils on tapered aircraft wings. Automatic and manually operable slot-forming airfoils, or slats, are old in the art, but these have been applied principally to rectangular planform wings of uniform thickness. The slats are usually provided with spaced supports constrained to joint and similar movement whereby the slot width will be uniform at all times throughout the slat span. With the modern trend toward cantilever wings tapered in thickness and planform, it is desirable that the leading edge slot, when formed, be tapered in correspondence with the wing and slat, for the purpose of securing best aerodynamic efficiency. Thus, it becomes desirable to control tapered slat movement in such a manner as to form a tapered slot. This necessitates a slat control linkage of differential character, and the provision of such a control linkage is one object of this invention.

Another object of the invention is to provide positive interconnecting means for slat supports on a so-called "slotted wing."

Another object is to provide means for attaining differential movement across the span of a slot-forming airfoil.

Still another object is to provide means for graduating or tapering the opening in the extending movement of an auxiliary slot-forming airfoil incorporated in the leading edge of a wing which is tapered in thickness and in planform.

Further objects of the invention will become apparent in reading the subjoined specification and claims, and from a consideration of the accompanying drawings, wherein like numerals denote like or corresponding parts, and wherein:

Fig. 1 is a plan of a portion of a tapered aircraft wing, broken away to show the airfoil control mechanism;

Fig. 2 is a front elevation of the wing;

Fig. 3 is an enlarged front sectional elevation on the line 3—3 of Fig. 1;

Fig. 4 is an enlarged fragmentary plan of the mechanism of Fig. 3;

Fig. 5 is an enlarged section on the line 5—5 of Fig. 1;

Fig. 6 is a side elevation of a portion of the auxiliary airfoil mounting, and

Fig. 7 is a section on the line 7—7 of Fig. 6.

Fixed within the tapered main wing 10 are spanwise spaced similar front brackets, one of which is shown at 11 in Fig. 1, this element also being shown in Fig. 5. These brackets carry a pair of spaced rollers 13. Rearwardly spaced from the brackets 11, and within the wing 10, are brackets 14 and 15 each carrying pairs of rollers 13. Between the several pairs of rollers 13 are mounted arms 16 and 16', the forward ends of which may protrude through the leading edge of the wing, these forward ends carrying a tapered auxiliary airfoil 17. On opposing side faces of the arms 16 and 16', short chain lengths 18 and 18' are secured as at 19 and 19', these chain lengths comprising a simple substitute for a gear rack, which latter could be substituted therefor. Adjacent each bracket 14 and 15, sprocket supports 22 and 25 are respectively secured, these supports carrying respectively coaxial sprockets 20 and 21 and 23 and 24. The sprocket 20 engages the chain 18, while the sprocket 23 engages the chain 18', the former sprocket being of larger diameter than the latter. The other sprockets 21 and 24 are of the same diameter and are geared for joint rotation with one another by chains 26 and 27 coupled together by crossed cables 28 and 29 whereby the sprockets 21 and 24 are constrained to joint uniform rotation in opposite directions. When the airfoil 17 moves away from the leading edge of the main wing 10, either automatically due to aerodynamic action, or forcibly by suitable control means, not shown, the movement of the arm 16 with its chain 18 causes the sprockets 20 and 21 to rotate, the sprocket 21 driving the sprocket 24 through the chain and cable connection, thus enforcing concurrent movement of the arm 16' through the sprocket 23 and the chain 18'. Since the sprocket 23 is of lesser diameter than the sprocket 20, the arm 16' moves a lesser distance than the arm 16, thereby producing a tapered slot between the wing 10 and the auxiliary airfoil 17, such movement being indicated by the broken lines 17' in Fig. 1.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an aircraft control mechanism, an auxiliary airfoil fixed on spaced support arms, said arms being mounted on guideways and in parallel relation for chordwise movement, and means for moving one arm a greater distance than the other, comprising interconnected differential means constituting integral pairs of rotating members, one member of each pair being of different diameter than the other member and being positively engaged with one support arm, the second members of the pairs of integral circular members being of the same diameter and being coupled for joint rotation by flexible means passing around the peripheries of both.

2. In a tapered aircraft wing, chordwise movable and spanwise spaced arms protruding therefrom, an auxiliary airfoil secured to the protruding arm ends, rack means secured to the facing sides of said arms, gear means drivably engaged with each of said arm rack means, and means interconnecting said gear means to enforce simultaneous similar rotation thereof, the gear means for an arm at a larger wing section having a larger drive ratio than the gear means for an arm at a smaller wing section, whereby the slot width between the wing and auxiliary airfoil is adjustable and decreases in the direction of the smaller wing sections.

3. In a slat control mechanism in a tapered aircraft wing, a pair of chordwise movable and spanwise spaced parallel arms carrying said slat, a large wheel drivably engaging the arm at the larger wing section, a small wheel drivably engaging the other arm, flexible means interconnecting said wheels to simultaneously enforce similar rotation of said wheels whereby the slot width between the wing and slat is adjustable and decreases in the direction of the smaller wing sections.

4. In a slat control mechanism in a tapered aircraft wing, a pair of chordwise movable and spanwise spaced parallel arms carrying said slat, a wheel drivably engaging each arm, flexible means to drivably interconnect said wheels for joint rotation at different peripheral speeds such that the arm at the larger wing section has a larger range of movement than the arm at the smaller wing section whereby the slot width between the wing and slat is adjustable and decreases in the direction of the smaller wing sections.

FRANK ERNY.
JOHN S. CZURLES.